Feb. 16, 1943.  D. J. MacKINNON  2,311,238
AIR FLOW INDICATOR
Filed Aug. 29, 1941
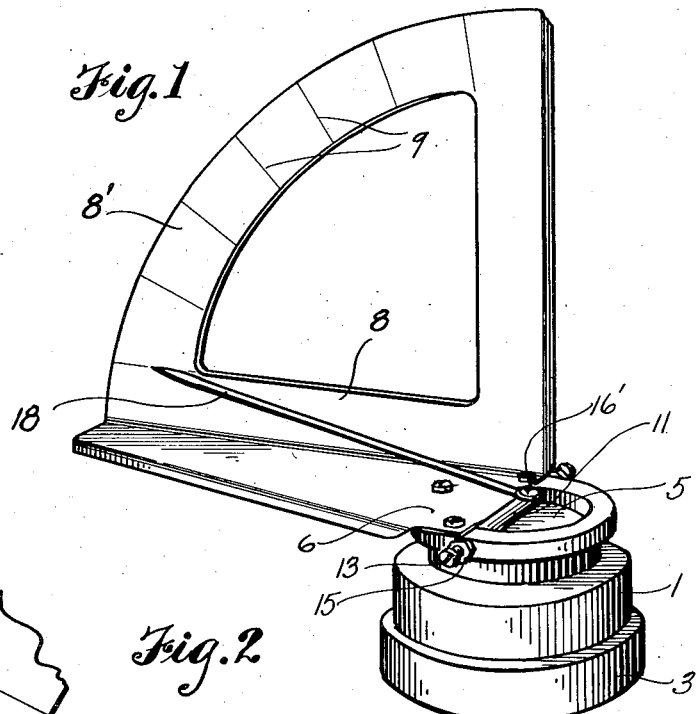
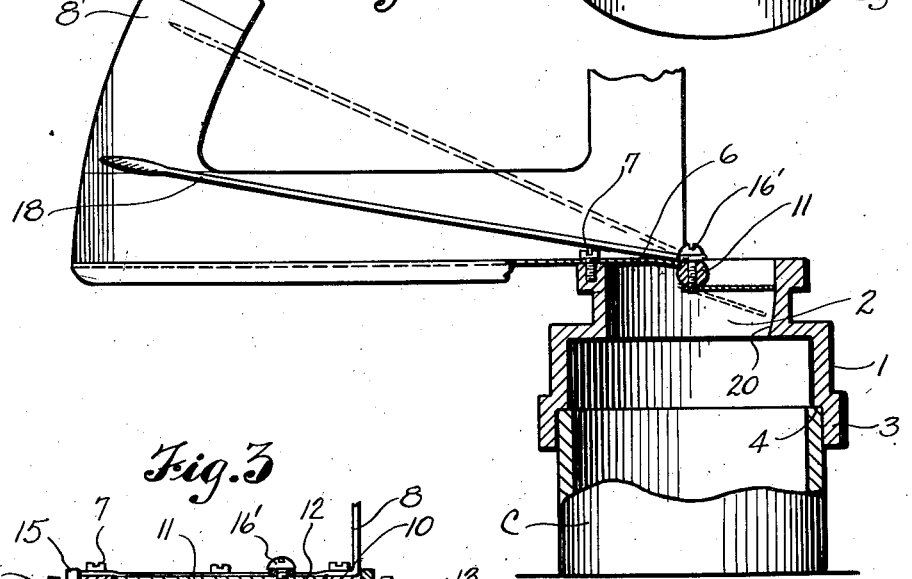
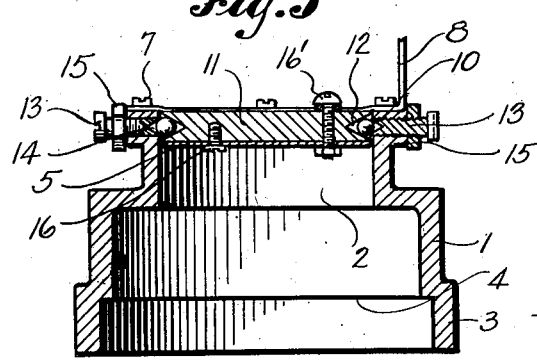
INVENTOR
DONALD J. MacKINNON
BY
Cook & Robinson
ATTORNEY Patented Feb. 16, 1943

2,311,238

UNITED STATES PATENT OFFICE 2,311,238

AIR-FLOW INDICATOR

Donald J. MacKinnon, Seattle, Wash.

Application August 29, 1941, Serial No. 408,850

3 Claims. (Cl. 73—228)

This invention relates to improvements in flow indicators, and it has reference more particularly to a device for visually indicating the relative velocity or rate of flow of air entering the throat of a carburetor in supplying an internal combustion engine with a carbureted fuel mixture.

More specifically stated, the present invention relates to a novel form of device for comparatively indicating velocities and rates of flow of air being supplied to the individual carburetors of an engine, or prime mover, employing more than one carburetor for the supplying of fuel thereto.

It is the principal object of this invention to provide a simple, accurate and relatively inexpensive means for indicating the flow of air to the individual carburetors of an internal combustion engine as an aid to any required synchronizing adjustment of its mechanical functions or mechanisms for producing greater efficiency and the most satisfactory results from the fuel consumption; the invention contemplating also the use of the device for the synchronizing of motors as used in various numbers in airplanes of different kinds where it is especially important that all be accurately adjusted to operate in unison.

Explanatory to the present invention and its mode of use, it will here be stated that the automotive industry, in years past, has to some extent, and to a gradually increasing extent in recent years, employed dual carburetion in connection with the vehicle engines. That is, prime movers, in the form of single or multiple engines have been equipped with two or more carburetors for the supplying of fuel to the several cylinders of the engine. In some instances, the carburetors used may operate in unison at all engine speeds, while in other instances they may operate together only at idling speeds, and are arranged to be progressively brought into action as the engine speed is increased to definite limits.

In any internal combustion engine employing dual carburetion, it is most desirable that the mechanical functions of the carburetors be so synchronized, or their control devices be so adjusted, that there will be no material or noticeable difference in the results of their operations, for the reason that when differences do exist, the operation of the engine will not be steady or the best efficiencies obtained. However, when the adjustments of controls of the various carburetors supplying the same engine or prime mover, are such as to result in the flow of air in equal amounts therethrough, then the maximum efficiency from the operation of the engine may be obtained.

In view of the above, it has been the principal object of this invention to provide a practical, easily used and reliable device, that may be readily applied to the air inlet of a carburetor of an engine to visually indicate the extent of the air flow therethrough for the purpose of making comparative tests of the functions of the different carburetors used with the same engine, as an aid in making the proper adjustment of controls to bring about the necessary or proper synchronization for obtaining the best results from the engine's operation.

Specifically stated, the present invention resides in the provision of a device for the above stated purposes, comprising a base member that is applicable to the air inlet of a carburetor and which has an air passage therein of definite cross-sectional area registerable with said air inlet passage and equipped with a pivotally mounted valve which will be actuated from closed position toward open position to a greater or lesser extent in accordance with the velocity or rate of flow of air entering the carburetor and which valve, by its movement, actuates a pointer along a marked scale to indicate the relative velocities of the entering air.

Still further objects of the invention reside in the details of construction and combination of parts embodied in the device, and in their mode of use and operation, as will hereinafter be fully described.

In accomplishing these and other objects of the invention, I have provided the improved details of construction, the preferred forms of which are illustrated in the accompanying drawing, wherein—

Fig. 1 is a perspective view of an air flow indicating device embodied by the present invention.

Fig. 2 is a cross sectional view, in a vertical plane, of the device as applied to the air inlet of a carburetor.

Fig. 3 is a sectional detail showing the valve mounting means.

Referring more in detail to the drawing—

For purpose of better understanding and convenience in explanation, I have, in Fig. 2, shown the present device as functionally applied to the air inlet or neck of a carburetor which is designated by reference character C. It is to be understood that the particular type, make, or design of the carburetor is not material to the present invention, except that it be such as to make possible the application of the flow indicator thereto, either directly or by use of inter-connecting fittings.

In its present preferred form of construction, the device comprises a mounting base 1 of annular form, with an axial passage 2 opening therethrough. The base 1 is formed at its lower end with an annular, depending flange 3 and with an internal, annular and downwardly facing shoulder 4.

The passage 2 is cylindrical, except as hereinafter mentioned, and has a semicircular valve disk 5 disposed therein. This valve disk is pivotally supported, and, in its closed position, closes the passage 2 at one side of a diametric line, while at the other side of that diametric line, the passage is permanently closed by the inner end portion of an overlying plate 6 that is fixed upon the upper end of the mounting base by a plurality of screws 7. This plate 6, in this instance, extends horizontally and laterally of the base 1, as a support for a vertically disposed, scale or gauge plate 8; the plate has an arcuate portion 8' at its periphery that is radially curved about the extended axial line of the valve mounting pivot, and preferably the arcuate portion of the plate has segments marked thereon, as indicated at 9, of equal extent and set off by different colors or other suitable markings.

The preferred means for pivotally mounting the valve disk 5 comprises a cross bar 11 disposed diametrically of, and within the upper end of passage 2. The ends of this bar are counterbored to form V-shaped sockets 12 in which ball bearings 10 are fitted and retained. Threaded into, and horizontally through the side walls of the base, diametric of passage 2, and in end alinement with the bar 11, are screws 13 having their inner ends formed with V-shaped seats 14 to seat the ball bearings 10 therein, and lock nuts 15 are applied to the screws for fixing them in proper adjustment so that the two ball bearings, coacting with the seats or sockets 12 and 14, form a practically frictionless support for the valve on which it is free to pivot as acted on by air currents passing downwardly through passage 2.

The valve disk 5 is fixed along its diametric edge to the under side of the bar 11 by screws 16, or other suitable means, and one of the screws, as that at 16', is utilized in this instance to attach a pointer 18 to the valve. The weight of this pointer is such as to urge the valve disk 5 to closed position. The outer end of the pointer 18 is disposed to move along the marked portion of the arcuate gauge plate 8.

By reference to Fig. 2, it will be observed that the passage 2 is closed at one side of the cross bar 11 by a part of the plate 6, and that the valve disk is so disposed that it will be acted on by air passing downwardly through the passage, and it will further be understood that increase and decrease in the velocity of the air stream will cause the valve to open to a greater or lesser extent accordingly. In order that the valve may have greater sensitivity when moving to a full open position, the passage may be somewhat restricted by the slight inward curving of the wall toward the arc of travel of the edge of the valve, as shown at 20 in Fig. 2.

With the device so constructed, it is used in the following manner for the testing, adjusting or synchronization of the carburetors of an engine:

First, if air strainers are applied to the engine's carburetors, they are removed; then the present testing device is applied to one of the carburetors by seating the lower end flange of the base 1 over the open upper end portion of the air inlet of the carburetor, as shown in Fig. 2, to provide an air-tight connection. Then the engine is set in operation at the desired testing speed. The air drawn into the engine in operation through the carburetor, must necessarily act on the pivoted valve disk and the valve will move to an open position. Thus, in its movement to open position, it moves the pointer 18 accordingly, and the position of the pointer relative to the marked scale, is noted for any particular, or for various engine speeds. Then, the device is applied to the other carburetor, and readings are taken for the same engine speed or speeds and comparison of readings is noted. If differences in the readings exist, the carburetor throttle stop screws are then adjusted as required to bring about like readings for the different carburetors for the same engine speeds. After these stops have been properly adjusted, the fuel mixture screws are then adjusted to produce the maximum revolutions per minute of the engine.

This device is designed in such way as to produce the same air drag on the carburetor air as is produced by the passing of air through the usual air strainer. Therefore, if the engine picks up in R. P. M. when the device is removed from the carburetor, this would indicate that too rich a fuel mixture was being supplied and adjustments should be made accordingly.

It has been quite effectively demonstrated that engines, after having their carburetors tested and adjusted by the aid of the present device, show slower and smoother road idling speeds, no bucking or missing due to improper adjustment of carburetors, and there is a reduction in danger of spark plug fouling because of the equal distribution of fuel to all cylinders at idling speed and the maintenance of even cylinder heat even on a down-hill drag.

It is to be understood that the present device might, if necessary, be altered in design to accommodate it to other types of carburetors, and to different requirement in its use, without departing from the spirit of the invention, and therefore it is not desired that the present claims be restricted to details of structure but that they be given an interpretation that is commensurate with the scope of the invention herein disclosed.

Having thus described my invention, what I claim as new therein and desire to secure by Letters Patent is:

1. A device of the character described comprising a base member formed with an air passage of definite area, a gauge plate mounted on the base member, a valve disk mounted in the air passage adapted to be moved from closed toward open position in accordance with the velocity of air moving inwardly through the passage, a pointer fixed to the valve member to swing therewith and adapted, by reason of its weight, to urge the valve toward closed position and disposed at its end for movement along the gauge plate to indicate relative velocities of air passing through the passage; said base member being formed with an annular flange and an internal, downwardly facing shoulder adapted to be applied to the air inlet member of a carburetor to functionally mount the device.

2. A device as recited in claim 2 wherein the air inlet passage of the base member is restricted in area in the direction of the opening swing of the valve disk.

3. A device of the character described, comprising a base member adapted to be applied to the air inlet member of a carburetor and formed with a passage through which air is required to pass to supply the carburetor, a valve member movably mounted in the said passage and adapted to swing on a supporting axis from closed toward open position in accordance with the velocity of air passing through said passage, a pointer movable with the valve member and an indicator plate mounted on the base member, and along which the pointer is adapted to move; said passage being restricted in area in the direction of opening swing of the valve member.

DONALD J. MacKINNON.